C. JOHNSON.
TOY VEHICLE.
APPLICATION FILED MAR. 28, 1919.
1,309,855.
Patented July 15, 1919.
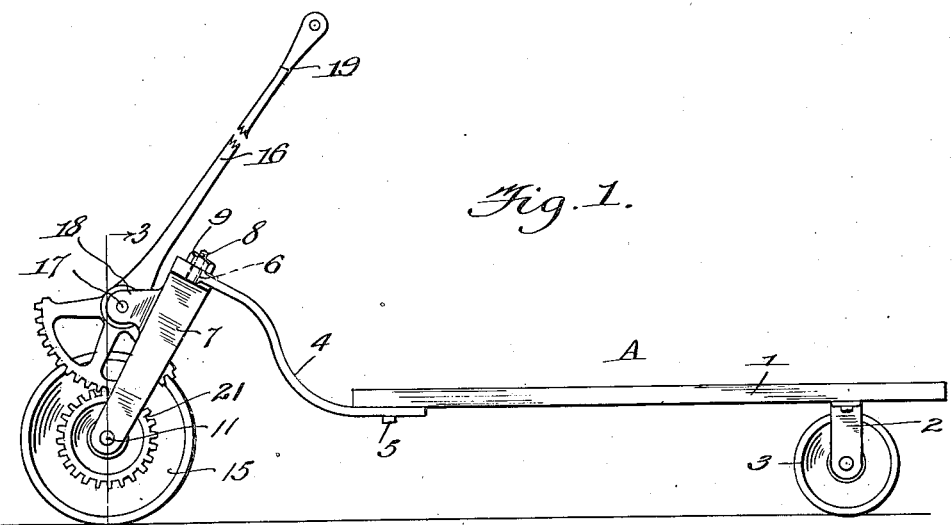
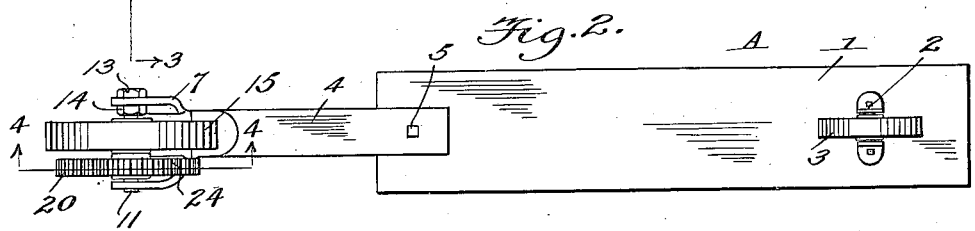
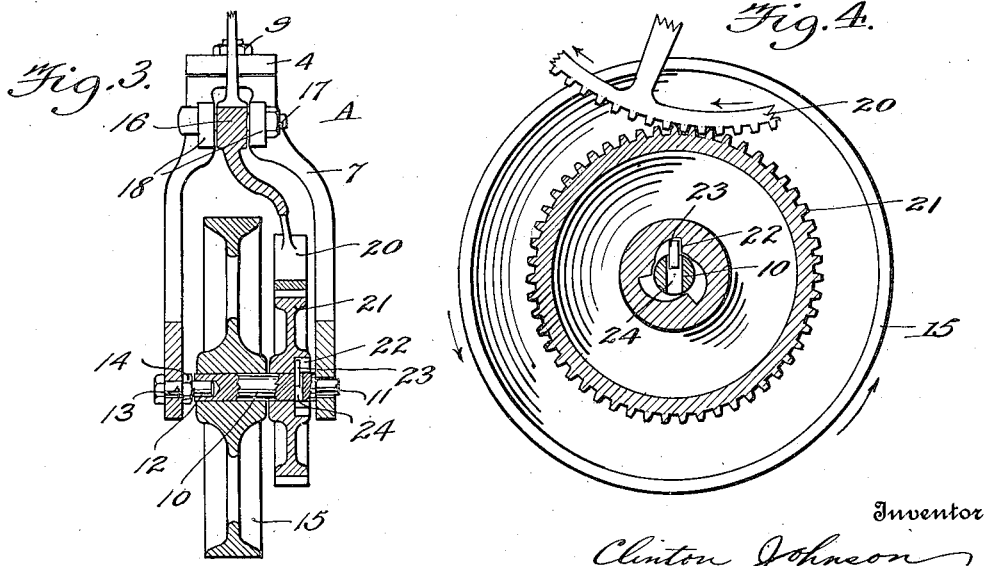
Witness
W. S. McDowell
Inventor
Clinton Johnson
By
C. C. Shepherd, Attorney

UNITED STATES PATENT OFFICE.

CLINTON JOHNSON, OF COLUMBUS, OHIO.

TOY VEHICLE.

1,309,855.

Specification of Letters Patent. Patented July 15, 1919.

Application filed March 28, 1919. Serial No. 285,839.

*To all whom it may concern:*

Be it known that I, CLINTON JOHNSON, a citizen of the United States, residing at Columbus, in the county of Franklin and State of Ohio, have invented certain new and useful Improvements in Toy Vehicles, of which the following is a specification.

This invention relates to toy vehicles, and has for its primary object to provide a pleasure furnishing vehicle particularly designed for children, wherein is provided a novel and easily operated structure which serves by manual operations to impart motion to the vehicle, in order that its propulsion may be accomplished in an efficient and positive manner without involving any undue fatigue or exertion on part of the operator.

In carrying out the invention, a vehicle is provided consisting of a wheel frame to the forward portion of which is swiveled a fork member, the latter rotatably carrying a combined steering and driving wheel, and an oscillatory handle structure is pivotally carried by the fork member for coöperation with a pawl and ratchet mechanism carried by the wheel axle in order that upon alternate oscillations of the handle structure, effected by the operator of the vehicle, power will be imparted to said wheel to effect its positive rotation and the consequent propulsion of the vehicle.

Another object of the invention consists in pivotally mounting the wheel supporting fork member in connection with a vehicle frame and to mount the handle upon the fork member in such manner that the latter may be employed in the dual capacity of rotating the driving wheel and to also control the guiding or steering of the vehicle.

Further objects reside in a toy vehicle of inexpensive, simple and efficient construction which is characterized by its durability and ease of operation, and to proportion and arrange the driving mechanism thereof so that the same may exercise maximum tractive effort with but a minimum of physical exertion.

For a further understanding of the invention reference is to be had to the following description and to the accompanying sheet of drawing, in which:

Figure 1 is a side elevation of a toy vehicle comprising the present invention,

Fig. 2 is a bottom plan view thereof,

Fig. 3 is a transverse vertical sectional view taken along the line 3—3 of Fig. 1, and Fig. 4 is a vertical sectional view taken along the line 4—4 of Fig. 2.

In its preferred adaptation the vehicle A comprising the preferred form of the invention consists of a wheeled supporting frame 1, which is shown to comprise a horizontally disposed supporting bar, having its under rear portion provided with a depending bracket 2, in which is rotatably mounted one or more rear wheels 3. A forward portion of the frame is provided with a forwardly extending curved bracket 4, rigidly connected at its rear end to the under face of the frame by means of securing elements 5, and the forward extremity of the bracket 4 terminating in a bearing 6 in the form of an angularly disposed bore. A fork member 7 is swiveled to the bracket 4 by providing the former with an upwardly extending stud 8, which is received within the bearing 6, in order that the member 7 may be freely rotated within said bearing. The upper end of the stud is threaded and is provided with a nut 9, in order to prevent separation of parts.

Rotatably journaled in the lower end of the fork member is an axle 10 which is provided with a reduced extremity 11 operating for rotation in a receiving opening formed in the fork member, the other end of the axle being provided with a centrally located bore 12, in which is positioned the end of a supporting bolt 13, the axle rotating freely around the cylindrical non-threaded end of the bolt. The latter is carried by the fork member and is retained in its place by means of a lock nut 14. By virtue of this construction the axle may be easily disconnected or connected for rotation with respect to the fork member. Rotatable with the axle 10 is a combined driving and steering wheel 15, which is positioned between the legs of the fork member 7 and may be either integrally formed with the axle or otherwise secured thereto. In order to impart motion to this wheel, use is made of an oscillatory handle structure 16, which is pivoted as at 17 between ears 18 formed on the fork member 7 and located at a point adjacent to the bearing 6. This handle structure includes an elongated handle portion 19 by means of which the structure may be conveniently grasped and operated by the user of the vehicle and the oscillation of the handle structure is employed to impart motion to the wheel 15. The lower part of the handle structure is provided with a segmental gear 20 which is rotatable in unison with the handle 19 and is disposed to mesh with a pinion 21 loosely mounted upon the axle 10. This pinion is provided around its axle bore with a plurality of ratchet teeth 22, which are arranged to engage with a centrifugal pin 23, loosely mounted for sliding movement in a bore 24 formed in the axle 10.

From the foregoing it will be apparent that by forcing the handle 19 rearwardly that the gear 20 will be rotated in the direction of the arrow shown in Fig. 4. This movement is correspondingly imparted to the pinion 21 so that the ratchet teeth of the latter will be caused to engage with the axle pin 23, thereby making the pinion and axle together for simultaneous rotation. Upon the forward movement of the handle 19 the pin 23 will be forced within its bore 24, thus causing the pinion 21 to ride loosely upon said axle and permits the handle structure to be freely oscillated to a position to permit of its next power imparting stroke. The pin or pawl 23 will of course engage with the radial portions of the teeth 22 by gravity and upon the rotation of the axle through the action of centrifugal force, thus causing a positive application of power to the wheel 15 upon each rearward pull on part of the handle 19.

From the foregoing it will thus be apparent that there is provided a vehicle of relatively inexpensive construction, of considerable utility and possessing improved features of construction for easily effecting its positive propulsion. By mounting the handle structure upon the fork member convenient means have been provided for controlling the steering of the vehicle as well as to impart power thereto, thus centralizing the control of the vehicle in the use of the handle structure.

What I claim is:

1. A toy vehicle of the class described, comprising a wheel frame, a fork member swiveled to the forward portion of said frame, a wheeled axle rotatably supported by said fork member, an oscillatory handle structure pivotally carried by said fork member to effect the rotation of said axle and capable of shifting the latter to govern the steering of the vehicle, said handle structure including a segmental gear situated below its point of pivotal connection with said member, a pinion loosely mounted on said axle and in mesh with said gear, ratchet means rotatable with said pinion, and a pawl carried by said shaft for engagement with said ratchet means upon alternate oscillations of said handle structure.

2. A toy vehicle comprising a wheel frame, a fork member having its upper end swiveled to the forward extremity of said frame, an axle rotatably carried by said fork member, a combined drive and steering wheel fixed upon said axle, an oscillatory handle structure pivotally connected with said fork member adjacent to the point of swivel connection of the latter with said frame, a segmental gear formed upon said handle below the pivotal point of the latter, a pinion loosely mounted upon said axle and in mesh with said gear, ratchet means formed with said pinion and disposed about said axle, and a pawl slidably mounted in an opening formed in said axle and operating to centrifugally engage with said teeth to effect the application of power to said axle upon alternate oscillations of said handle.

In testimony whereof I affix my signature.

CLINTON JOHNSON.